US009860039B2

(12) United States Patent
Larsson et al.

(10) Patent No.: US 9,860,039 B2
(45) Date of Patent: Jan. 2, 2018

(54) TECHNIQUE FOR ASSIGNING PILOT SIGNALS TO USER EQUIPMENTS

(71) Applicant: Telefonaktiebolaget L M Ericsson (publ), Stockholm (SE)

(72) Inventors: Erik G. Larsson, Linköping (SE); Emil Björnson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 112 days.

(21) Appl. No.: 14/429,534

(22) PCT Filed: Feb. 23, 2015

(86) PCT No.: PCT/EP2015/053737
§ 371 (c)(1),
(2) Date: Mar. 19, 2015

(87) PCT Pub. No.: WO2016/134744
PCT Pub. Date: Sep. 1, 2016

(65) Prior Publication Data
US 2016/0352479 A1    Dec. 1, 2016

(51) Int. Cl.
*H04L 5/00* (2006.01)
*H04W 74/08* (2009.01)

(52) U.S. Cl.
CPC .......... *H04L 5/0048* (2013.01); *H04L 5/0051* (2013.01); *H04W 74/0841* (2013.01)

(58) Field of Classification Search
None
See application file for complete search history.

(56) References Cited

FOREIGN PATENT DOCUMENTS

| EP | 2770764 A1 | 8/2014 | |
| FR | EP 2770764 A1 * | 8/2014 | ............ H04W 8/005 |

(Continued)

OTHER PUBLICATIONS

Larsson, E., et al., "Massive MIMO for Next Generation Wireless Systems", IEEE Communications Magazine, Feb. 1, 2014, pp. 186-195, IEEE.

(Continued)

*Primary Examiner* — Yemane Mesfin
*Assistant Examiner* — Jeff Banthrongsack
(74) *Attorney, Agent, or Firm* — Coats & Bennett, PLLC

(57) ABSTRACT

A technique for assigning pilot signals to user equipments is described. The user equipments access a radio base station that provides radio access. As to a method aspect of the technique, an access burst including initial pilot signals is received from the user equipments, wherein at least two of the user equipments apply simultaneously the same initial pilot signal. A multicast channel to the at least two user equipments is estimated based on the received access burst. A combined signal power received at the radio base station is computed for the at least two user equipments based on the estimated multicast channel. A message to the at least two user equipments is sent using the multicast channel. The message is indicative of the combined signal power and assigns different pilot signals to the at least two user equipments, wherein the assignment depends for each of the at least two user equipments on the combined signal power and a signal power received at the respective user equipment.

22 Claims, 7 Drawing Sheets

(56) References Cited

FOREIGN PATENT DOCUMENTS

| WO | 2010151830 A2 | 12/2010 | |
| WO | WO 2010151830 A2 * | 12/2010 | .......... H04W 74/008 |
| WO | 2011085403 A1 | 7/2011 | |
| WO | 2014025306 A1 | 2/2014 | |

OTHER PUBLICATIONS

Rusek, F., et al., "Scaling up MIMO: Opportunities and challenges with very large arrays," IEEE Signal Processing Magazine, Jan. 1, 2013, pp. 40-60, vol. 30, Issue 1, IEEE.

Ngo, H., et al., "Energy and Spectral Efficiency of Very Large Multiuser MIMO Systems", IEEE Transactions on Communications, Apr. 1, 2013, pp. 1436-1448, vol. 61, No. 4, IEEE.

Marzetta, T., "Noncooperative Cellular Wireless with Unlimited Numbers of Base Station Antennas", IEEE Transaction on Wireless Communications, Nov. 1, 2010, pp. 3590-3600, vol. 9, No. 11, IEEE.

Bj•rnson, E., et al., "Massive MIMO Systems With Non-Ideal Hardware:Energy Efficiency, Estimation, and Capacity Limits", IEEE Transactions on Information Theory, Nov. 1, 2014, pp. 7112-7139, vol. 60, No. 11, IEEE.

Bj•rnson, E., et al., "Optimizing Multi-Cell Massive MIMO for Spectral Efficiency: How Many Users Should Be Scheduled?", IEEE Global Conference on Signal and Information Processing (GlobalSIP 2014: Massive MIMO Communications), Jan. 1, 2014, pp. 612-616, IEEE.

Ngo, H., et al., "Aspects of Favorable Propagation in Massive MIMO", Proceedings of the 22nd European Signal Processing Conference (EUSIPCO), Sep. 1, 2014, pp. 76-80, IEEE.

Almers, P., et al., "Keyhole Effect in MIMO Wireless Channels: Measurements and Theory", IEEE Transactions on Wireless Communications, Dec. 1, 2006, pp. 3596-3604, vol. 5, No. 12, IEEE.

Ngo, H., "Blind Estimation of Effective Downlink Channel Gains in Massive MIMO", IEEE Communications Magazine,Feb. 1, 2014, pp. 186-195, vol. 52 , Issue: 2, IEEE.

Ngo, H., "Spectral Efficiency of the Multipair Two-Way Relay Channel with Massive Arrays", Asilomar Conference on Signals, Systems and Computers, Nov. 3, 2013, pp. 275-279, IEEE.

Yang, H., et al., "Multicast Performance of Large-Scale Antenna Systems", 2013 IEEE 14th Workshop on Signal Processing Advances in Wireless Communication (SPAWC), Jun. 16, 2013, pp. 604-608, IEEE.

* cited by examiner

TECHNIQUE FOR ASSIGNING PILOT SIGNALS TO USER EQUIPMENTS

TECHNICAL FIELD

The present disclosure generally relates to a technique for assigning pilot signals to user equipments. More specifically, and without limitation, methods and devices are provided for assigning pilot signals to user equipments when accessing a radio base station that provides radio access by means of a plurality of transceiving antennas.

BACKGROUND

Massive Multiple-Input Multiple-Output (massive-MIMO) radio transmission is a technique for wireless access, e.g., in telecommunications networks like or beyond Long Term Evolution (LTE). Hundreds of phase-coherently operating base station antennas serve many tens of user equipments on the same time-frequency resource.

Each user equipment needs to transmit its own pilot signal (also referred to as reference signal) in a coherence interval. The pilot signal allows the radio base station (e.g., an eNodeB in an LTE network) to measure Channel State Information (CSI) for the coherence interval. The massive-MIMO transmission uses the CSI for closed-loop beamforming, so that the number of user equipments that can be served per radio base station is significantly increased. However, the increased user density leads to an increase in the rate of user equipments accessing the radio base station for the first time, e.g., because the user equipment has been turned on or the user equipment has entered the coverage area of the radio base station. Furthermore, the closed-loop beamforming in massive-MIMO transmissions allows for high-mobility channels (e.g., for user equipments located in a high-speed train), which further adds to the rate of first-time accesses at the radio base station. For the first-time access, the user equipments select their pilot signals, e.g., randomly. The same pilot signal may be selected by different user equipments in the same coherence interval for the first-time access, since the number of different pilot signals is limited while the number of accessing user equipments is increasing. Hence, access bursts with colliding pilot signals can be expected to become more frequent.

Conventionally, user equipments transmitting the same pilot signal have to reattempt until their access bursts are collision-free, which causes delay and occupies radio resources. Increasing the length of the pilot signals would increase the number of distinct pilot signals. However, the longer the pilot signals the more radio capacity is occupied and unavailable for payload data.

SUMMARY

Accordingly, there is a need for a technique that, in at least some situations, efficiently assigns different pilot signals to different user equipments.

As to one aspect, a method of assigning pilot signals to user equipments accessing a radio base station that provides radio access is provided. The method comprises a step of receiving an access burst including initial pilot signals from the user equipments, wherein at least two of the user equipments apply simultaneously the same initial pilot signal; a step of estimating a multicast channel to the at least two user equipments based on the received access burst; a step of computing a combined signal power received at the radio base station for the at least two user equipments based on the estimated multicast channel; and a step of sending a message to the at least two user equipments using the multicast channel, wherein the message is indicative of the combined signal power and assigns different pilot signals to the at least two user equipments, wherein the assignment depends for each of the at least two user equipments on the combined signal power and a signal power received at the respective user equipment.

At least some embodiments of the technique allow assigning different pilot signals to the at least two user equipments in that the assignment depends on the received signal powers. The at least two user equipments may be distinguished based on respectively received signal powers. Same or other embodiments of the technique can efficiently assign all available pilot signals. E.g., embodiments can assign few remaining (i.e., not yet assigned pilot signals) without collisions or access retries, optionally including the assignment of the very last remaining pilot signal. Access reattempts, particularly unsuccessful reattempts, can be avoided in at least some situations.

The radio base station may be part of a telecommunications network. The radio base station may be part of a Radio Access Network for mobile telecommunication. The user equipments, e.g., the at least two user equipments, may comprise mobile, portable and/or stationary terminals.

The method may be performed by the radio base station. The access burst may be received on a Random Access Channel (RACH) of the radio base station. The pilot signal may also be referred to as a pilot sequence, preamble sequence or RACH preamble. The number of different pilot signals may be a power of two, e.g., $2^6=64$.

The pilot signal may also be referred to as a reference signal. Estimating the multicast channel may include at least one of determining Channel State Information (CSI) for the multicast channel and determining a precoder for the multicast channel. Using the multicast channel may include simultaneously beamforming from the plurality of transceiving antennas towards the at least two user equipments.

The received signal power may encompass a sent power (or transmit power) p and a channel gain (or link attenuation) $\beta$. The received signal power may include a product of link attenuation $\beta$ and transmit power p. The channel gain $\beta$ may include an attenuation of a radio link between the radio base station and the respective user equipment.

The signal power received at the user equipments A and B may be equal to the products $p_A \cdot \beta_A$ and $p_B \cdot \beta_B$, respectively. The combined signal power received at the radio base station may be equal to the sum of the signal powers received at the respective user equipments, e.g., $p_A \cdot \beta_A + p_B \cdot \beta_B$.

The combined signal power received at the radio base station and the signal power received at the respective user equipment may relate to the same coherence interval or the same resource block. The combined signal power received at the radio base station and the signal power received at the respective user equipment may be related due to channel reciprocity. The signal power received at the respective user equipment may be computed based on the message as received at the respective user equipment or based on a broadcast message from the radio base station as received at the respective user equipment. The broadcast message may include a beacon frame. The access burst may be received and the message or the broadcast message may be sent within the same coherence interval or the same resource block.

The at least two user equipments may include a first user equipment A and a second user equipment B different from the first user equipment A. The message may assign at least one first pilot signal $s_A$ to the first user equipment A, if twice the signal power received at the first user equipment A is greater than the combined signal power. The message may assign at least one second pilot signal $s_B$ (which is different from each of the at least one first pilot signal $s_A$) to the second user equipment B, if twice the signal power received at the second user equipment B is less than the combined signal power.

The pilot signals may be assigned so that the first pilot signal is assigned to the one of the user equipments which contribution to the combined signal power is greater than the contribution of the other of the two user equipments. The second pilot signal may be assigned to the one of the user equipments which contribution to the combined signal power is less than the contribution of the other of the two user equipments.

For any number of the at least two user equipments, the pilot signals may be assigned in the order of the signal power contribution of the respectively assigned one of the at least two user equipments to the combined signal power.

The message may assign a first set $S_A$ of pilot signals to the first user equipment and a second set $S_B$ of pilot signals disjoint from the first set to the second user equipment. The first set $S_A$ may include, or may be defined by, the at least one first pilot signal $s_A$. The second set $S_B$ may include, or may be defined by, the at least one second pilot signal $s_B$. The first user equipment A and the second user equipment B may select one first pilot signal $s_A$ and one second pilot signal $s_B$ out of the first set $S_A$ and the second set $S_A$, respectively. The selection may be based on a (pseudo) random number or an identifier of the respective user equipment. A user-specific identifier (e.g., stored on a SIM card) may be mapped onto the pilot signals in the respective set.

The initial pilot signals from the at least two user equipments may be received in the same coherence interval and/or the same resource block. The initial pilot signals from the at least two user equipments may overlap in time and frequency.

The radio base station may determine that the at least two user equipments use or apply the same initial pilot signal, if the received access burst is not decodable and a signal strength of the access burst exceeds a threshold value. The access burst may be not decodable as to information specific for each of the at least two user equipments. The signal strength may include at least one of a signal-to-noise ratio and the combined signal power.

The radio base station may provide the radio access by means of a plurality of transceiving antennas. The computation may include a summation over the plurality of transceiving antennas.

The summation may include squared absolute values of antenna components for the multicast channel. The antenna components may be related to the transceiving antennas, respectively. The plurality of transceiving antennas may include more than 10, e.g., more than 100 or 200, antennas at the radio base station. The radio base station may be configured for a massive Multiple-Input Multiple-Output (MIMO) communication with the user equipments. By way of example, the MIMO system (e.g., according to LTE) may include 8 antenna ports and more than 100 antennas. A number of user equipments served by the radio base station may be equal to or greater than 10, e.g., in the range of 40 to 50.

A further access burst may be received from each of the at least two user equipments after sending the message. The further access burst may include the respectively assigned pilot signal. Channel estimation may be performed for each of the at least two user equipments based on the respectively received further access burst.

The radio access may include a Time Division Duplex (TDD) transmission. The pilot signals may be configured for reverse channel estimation. The radio base station and the user equipments may form a TDD MIMO system. Channel reciprocity may be used to train a reverse link. Channel reciprocity may be used at the radio base station to obtain the channel estimate for the multicast channel to the at least two user equipments based on the same initial pilot signal and/or to obtain the channel estimates for the individual channels to each of the at least two user equipments.

As to another aspect, a method of assigning pilot signals to user equipments accessing a radio base station that provides radio access is provided. The method comprises a step of sending an access burst including an initial pilot signal from a user equipment to the radio base station, wherein at least one other of the user equipments applies simultaneously the same initial pilot signal; a step of receiving a multicast message from the radio base station, wherein the multicast message is indicative of a combined signal power received at the radio base station from the user equipment and the at least one other user equipment; a step of estimating a channel to the radio base station; a step of computing a signal power received at the user equipment based on the estimated channel; and a step of determining a pilot signal assigned to the user equipment, wherein the assignment depends on the combined signal power indicated by the multicast message and the signal power received at the user equipment.

The method may be performed by the user equipment. The access burst may be sent when the user equipment switches from a Radio Resource Control (RRC) idle state to an RRC connected state, when the user equipment loses synchronization with the radio base station (e.g., during uplink data transfer to the radio base station) or when the user equipment re-establishes the RRC connection (e.g., upon detecting a radio link failure or handover failure).

The channel may be estimated based on the multicast message as received at the user equipment or based on a broadcast message as received at the user equipment from the radio base station.

A first pilot signal may be assigned to the user equipment, if twice the signal power received at the user equipment is greater than the combined signal power. A second pilot signal (that is different from the first pilot signal) may be assigned to the user equipment, if twice the signal power received at the user equipment is less than the combined signal power.

A further access burst including the assigned pilot signal may be sent to the radio base station.

Any feature disclosed in the context of the one method aspect may be implemented in the context of the other method aspect. Any step corresponding to a step disclosed in the context of the one method aspect may also be performed in the context of the other aspect.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the telecommunications network and/or the Internet.

As to a still further aspect, a network node for assigning pilot signals to user equipments accessing a radio base station that provides radio access is provided. The network node comprises: an interface configured to communicate with the radio base station; and at least one processor coupled to the interface and configured to trigger the steps of any one of the one method aspect.

As to a still further aspect, a network node for assigning pilot signals to user equipments accessing a radio base station that provides radio access is provided. The network node comprises: an interface configured to communicate with the user equipments; and at least one processor coupled to the interface and configured to trigger the steps of any one of the another method aspect.

The network nodes may be implemented in a distributed network, e.g., the Internet.

According to one hardware aspect, a device for assigning pilot signals to user equipments accessing a radio base station that provides radio access is provided. The device comprises a receiving unit adapted to receive an access burst including initial pilot signals from the user equipments, wherein at least two of the user equipments apply simultaneously the same initial pilot signal; an estimating unit adapted to estimate a multicast channel to the at least two user equipments based on the received access burst; a computing unit adapted to compute a combined signal power received at the radio base station for the at least two user equipments based on the estimated multicast channel; and a sending unit adapted to send a message to the at least two user equipments using the multicast channel, wherein the message is indicative of the combined signal power and assigns different pilot signals to the at least two user equipments, wherein the assignment depends for each of the at least two user equipments on the combined signal power and a signal power received at the respective user equipment.

According to another hardware aspect, a device for assigning pilot signals to user equipments accessing a radio base station that provides radio access is provided. The device comprises a sending unit adapted to send an access burst including an initial pilot signal from a user equipment to the radio base station, wherein at least one other of the user equipments applies simultaneously the same initial pilot signal; a receiving unit adapted to receive a multicast message from the radio base station, wherein the multicast message is indicative of a combined signal power received at the radio base station from the user equipment and the at least one other user equipment; an estimating unit adapted to estimate a channel to the radio base station; a computing unit adapted to compute a signal power received at the user equipment based on the estimated channel; and a determining unit adapted to determine a pilot signal assigned to the user equipment, wherein the assignment depends on the combined signal power indicated by the multicast message and the signal power received at the user equipment.

Any one of the units of the devices, or a further dedicated unit, may be adapted to perform any one of the steps disclosed in the context of the method aspect. Furthermore, the devices may comprise any feature disclosed in the context of the method aspect.

As to a further aspect, a network node for assigning pilot signals to user equipments accessing a radio base station that provides radio access is provided. The network node comprises: an access burst reception module for receiving an access burst including initial pilot signals from the user equipments, wherein at least two of the user equipments apply simultaneously the same initial pilot signal; a channel estimation module for estimating a multicast channel to the at least two user equipments based on the received access burst; a signal power computation module for computing a combined signal power received at the radio base station for the at least two user equipments based on the estimated multicast channel; and a message send module for sending a message to the at least two user equipments using the multicast channel, wherein the message is indicative of the combined signal power and assigns different pilot signals to the at least two user equipments, wherein the assignment depends for each of the at least two user equipments on the combined signal power and a signal power received at the respective user equipment.

As to a still further aspect, a mobile terminal for assigning pilot signals to user equipments accessing a radio base station that provides radio access is provided. The mobile terminal comprises: An access burst send module for sending an access burst including an initial pilot signal from a user equipment to the radio base station, wherein at least one other of the user equipments applies simultaneously the same initial pilot signal; a message reception module for receiving a multicast message from the radio base station, wherein the multicast message is indicative of a combined signal power received at the radio base station from the user equipment and the at least one other user equipment; a channel estimation module for estimating a channel to the radio base station; a signal power computation module for computing a signal power received at the user equipment based on the estimated channel; and a pilot signal determination module for determining a pilot signal assigned to the user equipment, wherein the assignment depends on the combined signal power indicated by the multicast message and the signal power received at the user equipment.

The modules may be implemented by a computer program stored in memory coupled to a processor for running the computer program.

BRIEF DESCRIPTION OF THE DRAWINGS

In the following, the present disclosure is described in more detail with reference to exemplary embodiments illustrated in the drawings, wherein.

DETAILED DESCRIPTION

In the following description, for purposes of explanation and not limitation, specific details are set forth, such as specific network environments and specific transmission scenarios in order to provide a thorough understanding of the technique disclosed herein. It will be apparent to one skilled in the art that the technique may be practiced in other embodiments that depart from these specific details. Moreover, while the following embodiments are primarily described for a mobile telecommunications network operating next-generation antenna arrays, it will be readily apparent that the technique described herein may also be implemented in other mobile and stationary communication networks, including Wireless Local Area Networks (WLAN) according to IEEE 802.11 standards, Worldwide Interoperability for Microwave Access (WiMAX) networks according to IEEE 802.16 standards, Global System for Mobile Communications (GSM) networks, Universal Mobile Telecommunications System (UMTS) networks, Long Term Evolution (LTE) networks and LTE-Advanced networks.

Moreover, those skilled in the art will appreciate that the functions, steps and units explained herein may be implemented using software functioning in conjunction with a programmed microprocessor, an Application Specific Integrated Circuit (ASIC), a Field Programmable Gate Array (FPGA), a Digital Signal Processor or a general purpose computer, e.g., including an Advanced RISC Machine (ARM) processor. It will also be appreciated that, while the following embodiments are primarily described in context with methods and devices, the invention may also be embodied, e.g., according to modules, in a computer program product as well as in a system comprising a computer processor and memory coupled to the processor, wherein the memory is encoded with one or more programs that may perform the functions, steps and implement the units or modules disclosed herein.

Figure 1:
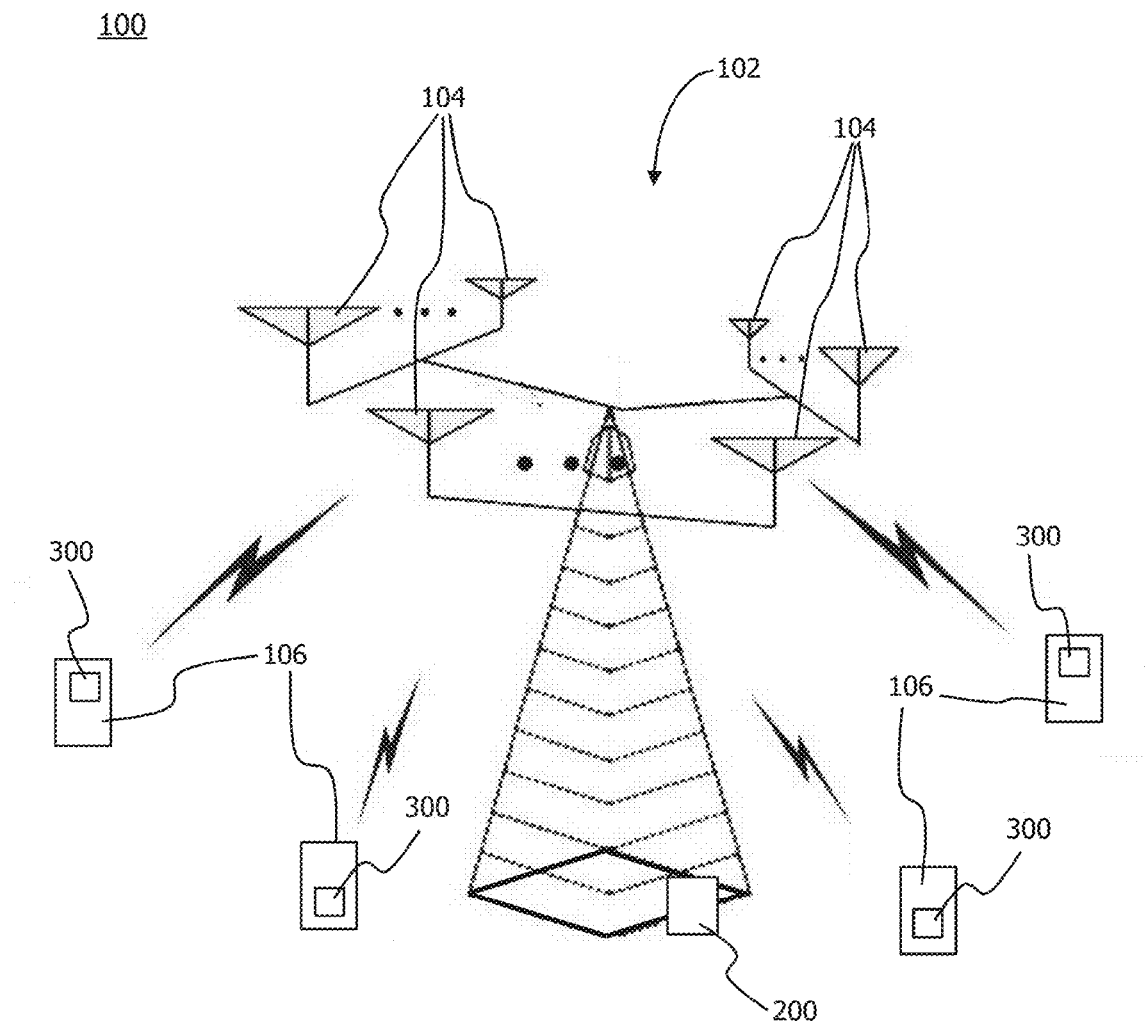
FIG. 1 is a block diagram schematically illustrating an embodiment of a network.

FIG. 1 schematically illustrates a telecommunications network 100 as an exemplary environment for implementing the technique. The telecommunications network 100 comprising at least one radio base station (RBS) 102. The telecommunications network 100 further comprises user equipments (UEs) 106. The RBS includes a plurality of transceiving antennas 104. The RBS 102 provides radio access by means of the transceiving antennas 104. The UEs 106 access the RBS 102. Two or more UEs 106 are within range for radio access to the RBS 102.

The number of antennas 104 and UEs 106 may deviate from those shown in FIG. 1. E.g., the technique is implemented using 40 to 50 antennas and/or less than 10 UEs.

In the context of an LTE implementation, the RBS 102 is also referred to as an eNodeB or eNB.

While different base station sites may cooperate for serving one or more of the UEs, this is not necessary for the technique. For clarity, and without limitation, the technique is described with reference to the telecommunications network 100 in FIG. 1, which provides radio access by means of the RBS 102.

For communication with the RBS 102 via a Multiple-Input Multiple Output (MIMO) channel, each UE 102 needs its own pilot signal. Different UEs 106 have to have different pilot signals, e.g., for establishing a Radio Resource Control (RRC) connected state with the RBS 102. The pilot signals should be mutually orthogonal. In other words, cross-correlations of one pilot signal with the pilot signals used by everyone else should be substantially lower than the peak autocorrelation of the pilot signal.

If $\tau$ samples are allocated to the pilot signal, there are at most $\tau$ orthogonal pilot signals available for the UEs 106. For example, if a coherence interval comprises 200 samples and 50 UEs 106 are to be served by the RBS 102, 50/200=1/4 of the coherence interval is allocated to the pilot signals. Hence, further increasing the number of pilot signals that are available for the RBS 102 cannot be afforded.

At some point in time, the UEs 106 access the RBS 102, e.g., in order to establish or join an uplink and/or downlink radio communication with the telecommunications network 100. The "newcomer" UEs 106 is unfamiliar to the RBS 102 in the sense that the RBS 102 does not have Channel State Information (CSI) for a MIMO channel dedicated to each of them and/or in that a unique pilot signal among the set of pilot signals available for the RBS 102 is not assigned to each of them. The expression newcomer UE, as used herein, encompasses any UE 106 for which the RBS 102 has no (or no valid) UE-specific channel estimation, UE-specific CSI and/or UE-specific precoder. Alternatively or in addition, the RBS has not assigned a dedicated pilot signal to the newcomer UE 106. For non-newcomer UEs, the CSI and precoding are re-estimated between coherence intervals using the dedicated pilot signals assigned by the RBS. Still alternatively or in addition, the expression newcomer UE, as used herein, encompasses any UE 106 that aims at accessing the telecommunications network 102.

The newcomer UEs 106 is attempt joining the network, e.g., by using a random access scheme. The pilot signals are selected, e.g. randomly or based on an UE-identifier, from a set of all possible pilots or from a subset thereof. By way of example, the subset is reserved to first-time access. The subset is complementary to a subset of protected pilot signals that may not be used for first-time access, thus limiting collisions to different newcomer UEs 106. The term "random", as used herein, encompasses pseudo-random, e.g., generated by means of a deterministic random bit generator implementable by a maximal linear feedback shift registers. E.g., at a random time, the UE 106 sends an access burst including data, which is detected by the RBS 102. At first glance, it may appear that the random access scheme can have the same characteristics in massive-MIMO systems as in conventional systems (e.g., Single-Input Single-Output transmissions or MIMO transmissions with 2 spatial layers). However, there are a couple of major differences related to the large number of transceiving antennas 104.

The access burst needs to be unique enough so that the RBS 102 is in a condition to meaningfully respond to the random access request. E.g., the RBS 102 estimates the full CSI to the accessing UE 106 so that closed-loop beamforming is enabled. To this end, the access burst includes a pilot signal that is exploited by the RBS 102 for channel estimation. If the pilot signal used by the UE 106 is unique, the UE 106 sends the pilot signal periodically in each coherence interval. The RBS 102 performs channel estimation based on the received pilot signal in each coherence interval. If the pilot signal used in the access burst of the UE 106 is also used by another UE 106 that simultaneously sends its access burst, the present technique is applicable to resolve the conflict.

By way of example, to perform downlink beamforming to the newcomer UE 106 that is trying to access the telecommunications network 100, the RBS 102 must be able to estimate the CSI from the access burst. This means that the newcomer UE 106 needs to have its own pilot signal that is orthogonal to every other pilot signal currently in use in the cell. This is a problem, because there are generally not enough symbol sequences defining the different pilot signals available. For example, out of 50 distinct pilot signals assignable within one cell served by the RBS 102, 40 pilot signals are reserved to active (e.g., RRC-connected) UEs 106 and the remaining 10 pilot signals are reserved for random access (i.e., for use by newcomer UEs 106, e.g., RRC-idle UEs 106).

If there are many newcomer UEs 106, there is a substantial probability that (at least) two of them choose the same pilot signals among those reserved for random access. If a pilot signal collision occurs, the RBS 102 has no way of distinguishing the (at least) two UEs 106. All the more, the RBS 102 cannot identify the (at least) two UEs 106.

A conventional approach of resolving the conflict is for the at least two UEs 106 to try again, e.g., at a random point in time and/or by selecting a random pilot signal (also referred to as "Aloha" approach). The conventional approach is inefficient in terms of delay and throughput. Particularly when the system load is high, rare radio capacity is occupied by access attempts. The present technique is applicable to resolve the conflict more efficiently.

Figure 2:
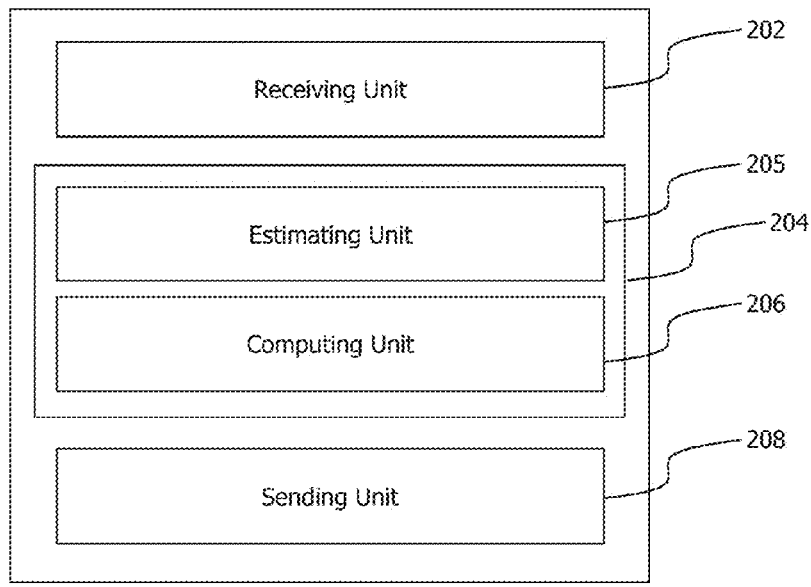
FIG. 2 is a block diagram schematically illustrating an embodiment of a device.

FIG. 2 shows a schematic block diagram of a device 200 for assigning pilot signals to user equipments that access a radio base station, e.g., the radio base station of FIG. 1. The radio base station provides radio access to the user equipments via a plurality of transceiving antennas. The device 200 comprises a receiving unit 202 adapted to receive access bursts from the user equipments at the radio base station within a coherence interval. The received access bursts include pilot signals from the user equipments.

An estimating unit 205 of the device 200 is adapted to perform channel estimation based on the received access bursts for channels distinguished based on different pilot signals. A computing unit 206 of the device 200 is adapted to sum up, over the plurality of transceiving antennas, signal power as received at the radio base station for the channels distinguished based on the different pilot signals. A channel analysis unit 204 may implement both the estimating unit 205 and the computing unit 206.

If one of the different pilot signals is used by at least two of the user equipments (e.g., among the user equipments from which the access bursts are received in the coherence interval), the corresponding estimated channel is a multicast channel to the at least two user equipments. The received signal power computed for the multicast channel is a combined signal power received at the radio base station from the at least two user equipments.

A sending unit 208 is adapted to send a message on the broadcast channel to the at least two user equipments. The broadcast message is indicative of the combined signal power. The broadcast message triggers the at least two user equipments to set their own pilot signal depending on a signal power received at the respective one of the at least two user equipments in comparison with the combined signal power indicated in the broadcast message.

The device 200 may be implemented at the RBS 102.

Figure 3:
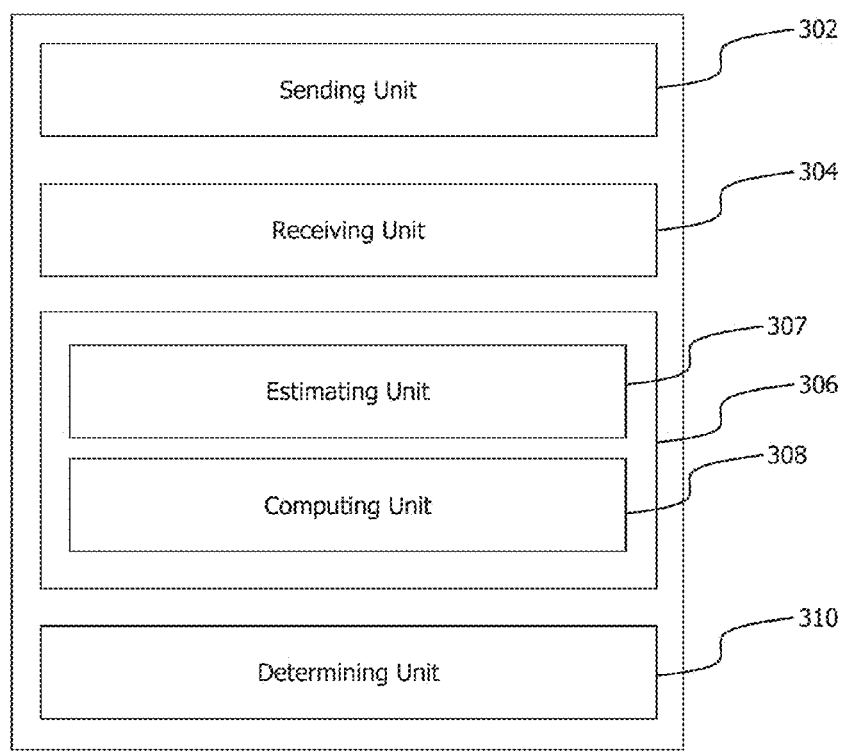
FIG. 3 is a block diagram schematically illustrating an embodiment of a device for assigning pilot signals to user equipments, which is implementable at any one of the user equipments of FIG. 1.

FIG. 3 shows a schematic block diagram of a device 300 for assigning pilot signals to user equipments that access a radio base station, e.g., the user equipments of FIG. 1. The radio base station provides radio access to the user equipments via a plurality of transceiving antennas.

The device 300 comprises a sending unit 302 adapted to send an access burst from a user equipment to the radio base station within a coherence interval. The access burst includes a pilot signal from the user equipment. The user equipment selects the pilot signal to be included in the access burst.

A receiving unit 304 is adapted to receive a message from the radio base station in response to the access burst. The receiving unit or any other unit of the user equipment determines that the message is indicative of a combined signal power, as received at the radio base station. The determination implies that at least one further user equipment has sent the same pilot signal in the coherence interval. The determination further implies that the received message has been sent using a multicast channel from the radio base station to the user equipment and the at least one further user equipment.

An estimating unit 307 of the device 300 is adapted to estimate a channel to the radio base station, e.g., by performing channel estimation based on the received multicast message. A computing unit 308 of the device 300 is adapted compute a signal power as received at the user equipment from the radio base station based on the estimated channel. Optionally, a channel analysis unit 306 implements both the estimating unit 307 and the computing unit 308.

A determining unit 310 is adapted to determine a pilot assigned to the user equipment by comparing the computed received signal power with the combined signal power.

In an exemplary implementation, the received message includes one or more lists of pilot signals and the user equipment selects its own pilot signal from the one or more lists. E.g., a list out of two or more lists or a position in the list is determined.

The device 300 may be implemented at one or more of the UEs 106.

Figure 4:
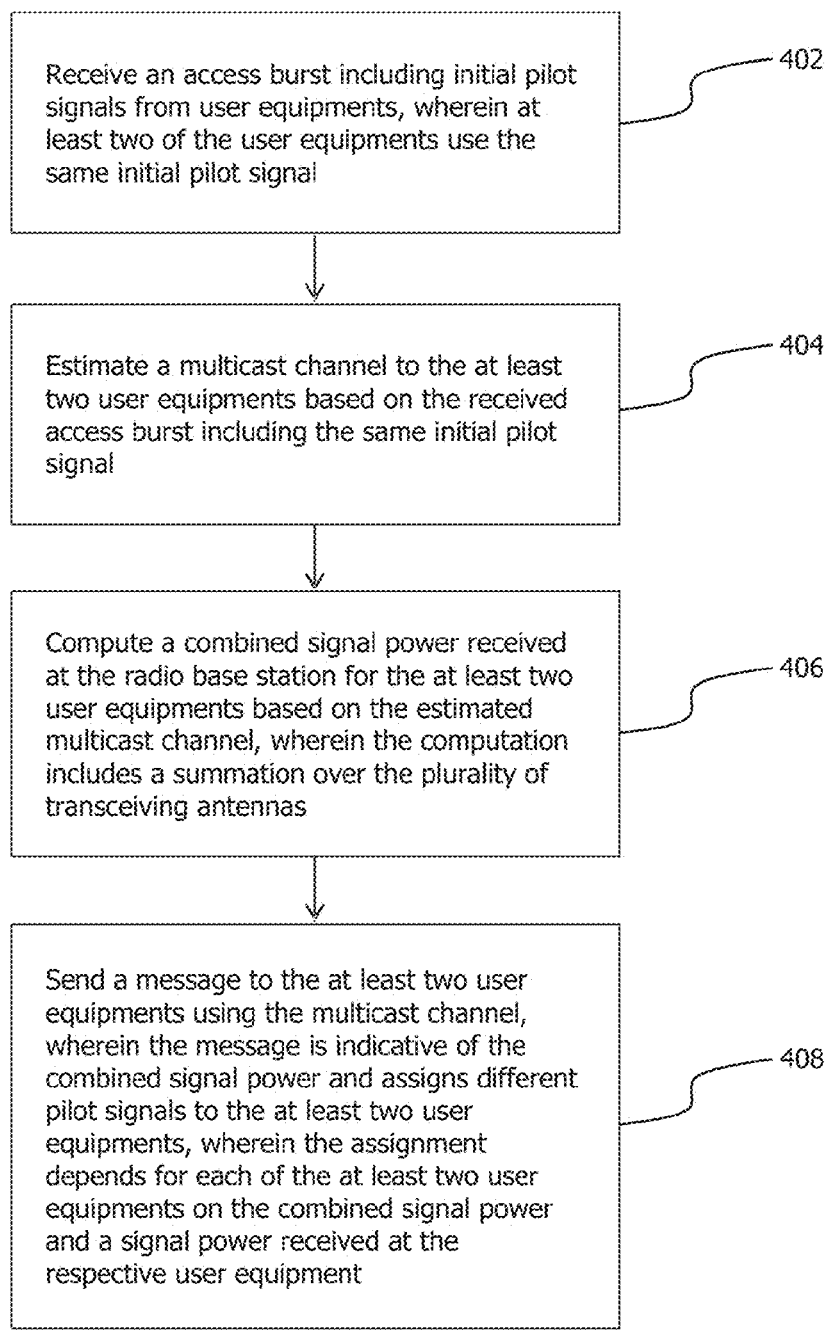
FIG. 4 is a flowchart illustrating embodiments of the method steps.

FIG. 4 shows a flowchart for a method 400 of assigning pilot signals to user equipments accessing a radio base station, e.g., the radio base station of FIG. 1. The radio base station provides radio access by means of a plurality of transceiving antennas. The method 400 comprises a step 402 of an access burst including initial pilot signals from the user equipments. At least two of the user equipments use the same initial pilot signal.

In an estimating step 404, a multicast channel to the at least two user equipments is estimated based on the received access burst including the same initial pilot signal. In a computing step 406, a combined signal power received at the radio base station is computed for the at least two user equipments based on the estimated multicast channel. The computation includes a summation over the plurality of transceiving antennas. In a sending step 408, a message is sent to the at least two user equipments using the multicast channel. The message is indicative of the combined signal power and assigns different pilot signals to the at least two user equipments. The assignment depends for each of the at least two user equipments on the combined signal power and a signal power received at the respective user equipment.

The method 400 may be implemented at the RBS 102, e.g. in the device 200. The units 202, 205, 206 and 208 may perform the steps 402 to 408, respectively. The method 400 may be performed when the RBS 102 is accessed using a colliding pilot signal.

Figure 5:
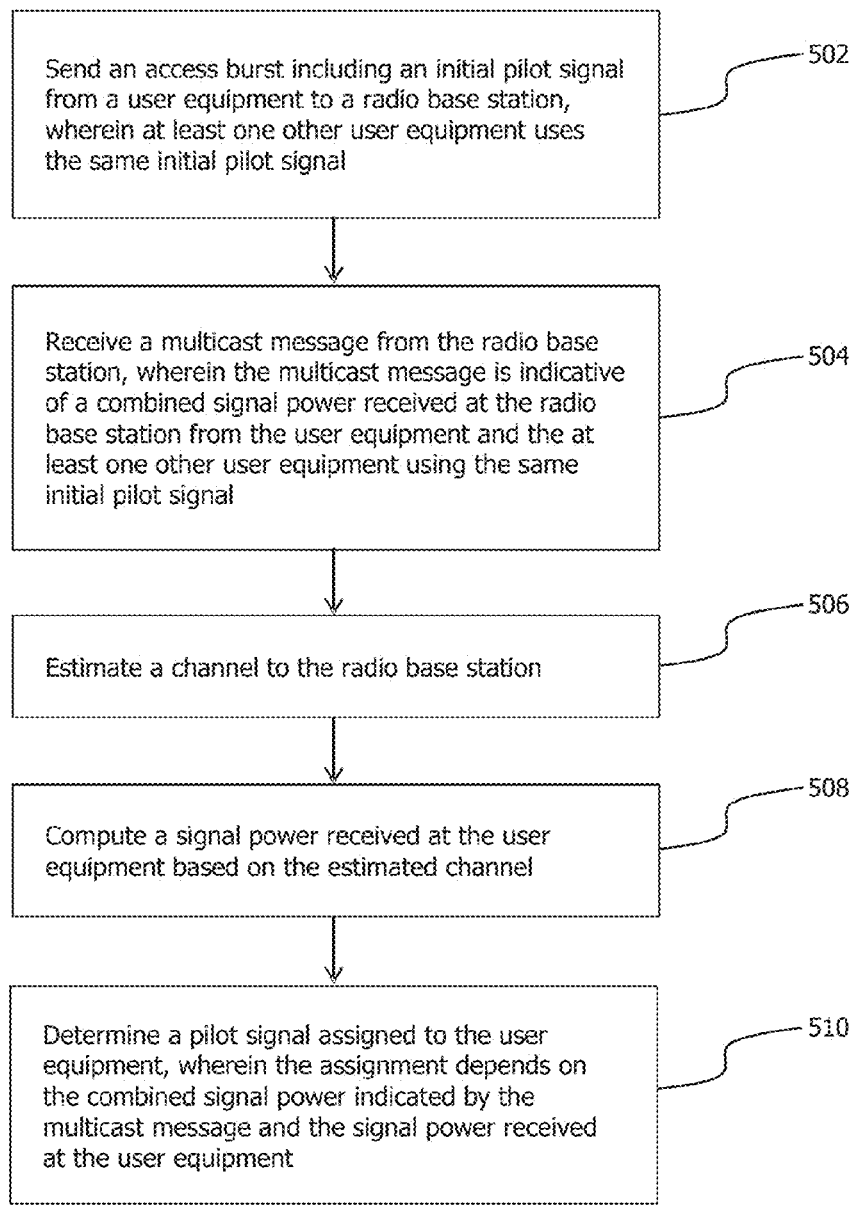
FIG. 5 is a flowchart illustrating embodiments of the method steps.

FIG. 5 shows a flowchart for a method 500 of assigning pilot signals to user equipments accessing a radio base station, e.g., the user equipments of FIG. 1. The radio base station provides radio access by means of a plurality of transceiving antennas. The method 500 comprises a step 502 of sending an access burst including an initial pilot signal from a user equipment to the radio base station. At least one other of the user equipments uses the same initial pilot signal. In a step 504, a multicast message is received from the radio base station. The multicast message is indicative of a combined signal power received at the radio base station from the user equipment and the at least one other user equipment using the same initial pilot signal. In a step 506, a channel to the radio base station is estimated. In a step 508, a signal power received at the user equipment is computed based on the estimated channel. In a step 510, the assigned pilot signal for the user equipment is determined. The assignment depends on the combined signal power indicated by the multicast message and the signal power received at the user equipment.

The method 500 may be implemented at one or more of the UEs 106, e.g., in the device 300. The units 302, 304, 307, 308 and 310 may perform the steps 502 to 510, respectively. The method 500 may be performed when two or more UEs 106 access the RBS 102 using a colliding pilot signal.

Figure 6:
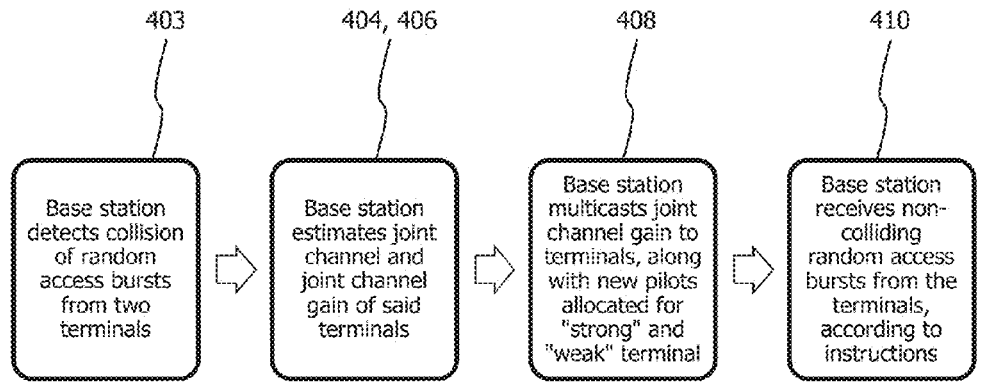
FIG. 6 is a flowchart illustrating embodiments of the method steps.

FIG. 6 shows a flowchart for an implementation of the method 400. Steps corresponding to those of FIG. 4 are indicated by corresponding reference signs. The telecommunications network 100 comprises at least one RBS 102 and at least two UEs 106, denoted by A and B. The RBS 102 detects a collision between two random access bursts from the UEs A and B, respectively, in a step 403. The step 403 is optionally implemented as a substep of the step 402. In the event of a pilot signal collision detected in the access bursts, the RBS 102 estimates a channel, $\hat{g}$, based on the colliding pilot signals the step 404. Herein, $\hat{g}$ is a vector including the complex-valued channel estimates for each of the radio base station antennas 104. As the estimates are based on the colliding pilot signals, $\hat{g}$ includes contributions from each of the corresponding UEs 106 (cf. Eq. (3) below).

The RBS 102 computes in the step 406 the received signal power, $\|\hat{g}\|^2$, in the event of a detected collision. The received signal power $\|\hat{g}\|^2$ includes a summation over the plurality of M transceiving antennas 104. The received signal power $\|\hat{g}\|^2$ is summed, e.g., averaged, over the plurality of transceiving antennas 104. The averaged received signal power, $\|\hat{g}\|^2/M$, in the uplink transmission is an exemplary estimator for the average of individually received signal powers at the UEs A and B in a downlink transmission within the same coherence interval:

$$p_A\beta_A + p_B\beta_B.$$

The RBS 102, in the event of a detected collision, selects two distinct sets x and Y of pilot signals $x_i$ and $y_i$, respectively, from a predetermined pilot codebook (e.g., in the step 408). The RBS 102 multicasts the multicast message (e.g., a control packet) with beamforming along the multicast channel $\hat{g}$, in the event of a detected collision, in the step 408. The message includes the estimate of $p_A\beta_A + p_B\beta_B$, an instruction that the stronger one of the UEs A and B has to use a pilot signal x (e.g., randomly selected) from the set X, and that the weaker one of the UEs A and B has to use a pilot signal y (e.g., randomly selected) from the set Y. In an exemplary implementation, the respective UE determines being the stronger or weaker one by comparing twice its channel gain with the combined channel gain.

As a result of the steps 502 to 508 of the method 500, the UEs A and B have computed their individually received signal powers $p_A\beta_A$ and $p_B\beta_B$, respectively, in a downlink transmission within the same coherence interval during which the access burst is sent. According to the step 510, each of the UEs A and B determines whether it is the stronger one of the UEs A and B or the weaker one of the UEs A and B.

The UEs A and B re-access the RBS 102 using new pilot signals according to the instruction from the RBS 102. In a corresponding step 410, the RBS 102 receives the further access bursts including collision-free pilot signals from the UEs A and B, respectively.

Background information for massive-MIMO operation is provided in detail, for example, in tutorials by E. G. Larsson et al. "Massive MIMO for next generation wireless systems", IEEE Commun. Mag., vol. 52, no. 2, pp. 186-195, February 2014; and by F. Rusek et al. in "Scaling up MIMO: Opportunities and challenges with very large arrays", IEEE Signal Process. Mag., vol. 30, no. 1, pp. 40-60, January 2013.

Further technical details about beamforming and CSI estimation are provided, for example, by H. Q. Ngo et al. in "Energy and spectral efficiency of very large multiuser MIMO systems", IEEE Trans. Commun., vol. 61, pp. 1436-1449, April 2013; by T. L. Marzetta in "Noncooperative cellular wireless with unlimited numbers of base station antennas", IEEE Trans. Wireless Commun., vol. 9, no. 11, pp. 3590-3600, November 2010; by E. Björnson et al. in "Massive MIMO systems with non-ideal hardware: Energy efficiency, estimation, and capacity limits", IEEE Trans. Inf. Theory, vol. 60, no. 11, pp. 7112-7139, November 2014; and by E. Björnson et al. in "Optimizing multi-cell massive MIMO for spectral efficiency: How many users should be scheduled?", in Proc. IEEE Global Conf. on Signal and Inf. Process. (GlobalSIP), 2014.

An embodiment of the technique is described in more detailed with exemplary explanations for numerical relations useful for implementing the evaluation steps 404, 506 and the computing steps 406, 508. Well-known properties of massive-MIMO, i.e., M>>1 (e.g., M≥9, M≥16 or M≥25) include channel hardening and near-orthogonality (also referred to as asymptotic orthogonality) between channels of the UEs.

Figure 7:
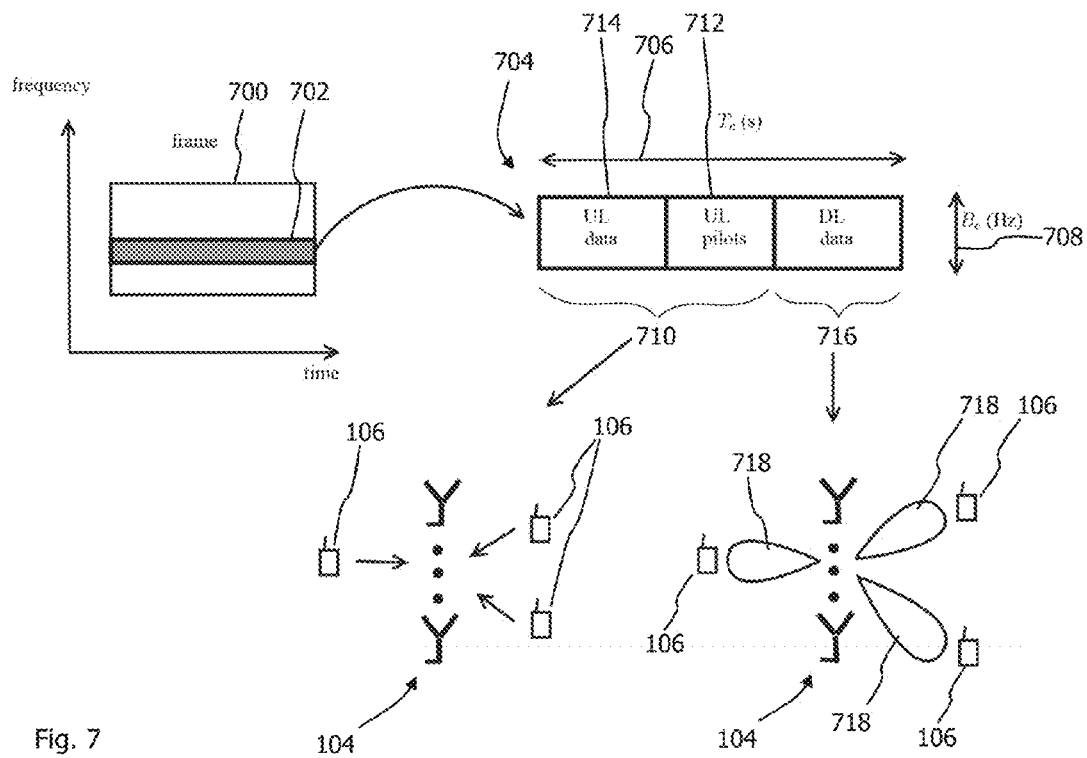
FIG. 7 is a diagram schematically illustrating an embodiment of a multicast channel used for an implementation of the methods of FIGS. 4 and 5.

FIG. 7 schematically illustrates a massive-MIMO communication with Time-Division Duplex (TDD) operation. FIG. 7 shows (in its top-left) a time-frequency grid including a frame 700 for bidirectional radio transmission from and to the RBS 102. A spectral window 702 is allocated to the UEs 106 for a Time-Division Duplex (TDD) communication with the RBS 102.

The time-frequency plane is partitioned into frames 700, which in turn are partitioned into coherence intervals 706. In combination with a spectral range 708, the coherence intervals are also referred to as Resource Blocks (RBs) 704. For a spectral width $B_C$ indicated at reference sign 708 for the RB 704, the coherence interval 706 comprises $B_C \cdot T_C$ samples in the time domain.

During one coherence interval 706, the channel between each transmit antenna (e.g., the antennas 104 in case of a DL transmission) and each receive antenna (e.g., the antennas 104 in case of an UL transmission) substantially acts as a scaling with a complex number $g_{m,k}$ for m=1, . . . , M and k=1, . . . , K. In other words, electromagnetic radio propagation from each of the transmit antennas to each of the receive antennas is represented by a channel gain and a channel phase. The method can be performed within each coherence interval 706. The method can be performed independently for each coherence interval 706.

Channel hardening relates to the observation that the channel impulse responses $g_k$ of a massive-MIMO transmission "harden", at least in most propagation environments. This means, more exactly, that if $g_k$ denotes an M-vector comprising the complex-valued gains $g_{m,k}$ (for m=1, . . . , M) from the M RBS antennas 104 to the k-th UE 106 in a given coherence interval, then when M is large $$\frac{1}{M} \| g_k \|^2 \approx \beta_k, \qquad (1)$$

wherein $\beta_k$ is a scalar number that does not depend on an instantiation of fast fading but only on parameters that vary slowly, e.g., path loss and shadow fading.

Equation (1) is true in many diverse propagation environments. For example, in a propagation environment with independently and identically distributed (i.i.d.) Rayleigh fading, Eq. (1) holds because of the law of large numbers. The sum of M independent exponentially distributed random numbers, normalized by M, converges to its expected value when M→∞. Line-of-sight propagation according to H. Q. Ngo et al. in "Aspects of favorable propagation in massive MIMO", in Proc. European Wireless, 2014, is a further example for a propagation environment in which Eq. (1) applies.

There are also very special propagation environments without channel hardening (e.g., the keyhole channel observed by P. Almers et al. in "Keyhole effect in MIMO wireless channels: Measurements and theory", IEEE Trans. Wireless Commun., vol. 12, no. 5, pp. 3596-3604, December 2006, and analyzed by H. Q. Ngo and E. G. Larsson in "Blind estimation of effective downlink channel gains in massive MIMO" in Proc. IEEE Int. Conf. on Acoustics, Speech, and Signal Process. (ICASSP), preprint identifier urn:nbn:se:liu:diva-112759). Consequently, the proposed explanations and relations should be thought of as a way of significantly enhancing a random access mechanism in at least many propagation environments.

Another consequence of channel hardening is that channels to different UEs 106 are nearly orthogonal if M is large. Denoting the channels from the RBS 102 to UEs A and B by $g_A$ and $g_B$, respectively, the near-orthogonality means that $$\frac{1}{M} g_A^H g_B \approx 0. \quad (2)$$

The multicasting channel to the UEs A and B used by the unit 208 for the step 408 includes both a channel component $g_A$ and a channel component $g_B$. Since the two UEs A and B transmit the same pilot signal in their access burst 710, the RBS 102 obtains a channel estimate $$\hat{g} = \sqrt{p_A} g_A + \sqrt{p_B} g_B + \tilde{n} \quad (3)$$

during the channel estimation step 404, wherein $g_A$ and $g_B$ are the individual channels to UEs A and B for the coherence interval 706. At this point, the individual channels $g_A$ and $g_B$ are not known to the RBS 102.

Power-control coefficients for the UEs A and B are denoted by $p_A$ and $P_B$, respectively. A typical massive-MIMO implementation assumes that $p_A$ and $p_B$ are both put to their maximal value in the initial pilot transmission 712 (i.e., in the access burst 710), to achieve high estimation accuracy. More generally, an exemplary implementation assumes that $p_A = p_B$. The present technique is, however, applicable for any non-zero $p_A$ and $p_B$.

The vector $\tilde{n}$ is an estimation error (e.g., resulting from thermal noise and, potentially, interference from distant cells). Hence, the RBS 102 cannot determine $g_A$ and $g_B$ individually. The RBS 102 measures the power-controlled sum $$\sqrt{p_A} g_A + \sqrt{p_B} g_B.$$

Since the channels $g_A$ and $g_B$ are near-orthogonal in massive-MIMO, as described with reference to Eq. (2), the channels do not cancel out one another in above sum. Thus, the RBS 102 obtains a useful CSI for the multicast channel to both UEs A and B.

This phenomenon is exploited for the purpose of multicasting in the step 408 for sending the same message 716 to the colliding UEs 106. Technically, the message 716 is beamformed along $\hat{g}$ (which is known to the RBS 102 as a result of the step 404), so that the message 716 reaches both UEs A and B.

A pilot collision occurs between two newcomer UEs A and B, i.e. the UEs A and B use the same pilot signal 712 in their overlaying access bursts 710 within the coherence interval 706. The RBS 102 obtains in the step 404 the estimate $\hat{g} = \sqrt{p_A} g_A + \sqrt{p_B} g_B + \tilde{n}$ according to Eq. (3) for the multicast channel.

The RBS 102 cannot decode UE-specific information 714 contained in the received access burst 710. Hence, the RBS 102 cannot distinguish or identify the newcomers UEs A and B. However, the RBS 102 is able to determine, with reasonable certainty, that a collision has occurred. For example, the RBS 102 determines the presence of a pilot signal collision in the step 403 by concluding that decoding of the access burst 710 failed although the received (combined) pilot signal power $\|\hat{g}\|^2$ is above a threshold that is likely to give successful decoding when there are no collisions.

Having detected the collision, the RBS 102 sends in the step 408 the message 716, which is received at both UEs A and B, by beamforming along the channel estimate $\hat{g}$.

The RBS 102 indicates in the message 716 to the two UEs A and B to select pilot signals from the sets X and Y, instead of the pilot signal 712 used in the access burst 710. The sets X and Y have no pilot signal in common. Since the RBS 102 cannot identify or distinguish the UEs A and B, the RBS 102 cannot address them individually. Moreover, the UEs A and B cannot identify or address the respectively other UE using the same pilot signal 712 in the access burst 710.

In a reduced implementation, the pilot-collision problem is statistically solved. The RBS 102 instructs in the message 716 to select pilot signals from the sets X and Y, instead of the pilot signal 712 used in the access burst 710. In the reduced implementation, the UEs A and B randomly select a pilot signal from the set X or Y. With 50% probability, the UEs A and B select the same set. Thus, a further collision will occur in the retransmission of the access burst with probability $$\frac{0.25}{|X|} + \frac{0.25}{|Y|},$$

wherein |X| and |Y| are the number of pilots in each set.

For example, |X|=|Y|=1 leads to 50% collision probability in the retransmission and |X|=|Y|=5 leads to 10% collision probability in the retransmission.

In an advanced implementation, the message 716 instructs the UEs A and B to determine different pilot signals based on the indicated combined signal power and the individually measured signal power. Since $$\frac{1}{M} \|g_A\|^2 \approx \beta_A \text{ and } \frac{1}{M} \|g_B\|^2 \approx \beta_B, \text{ and } \frac{1}{M} g_A^H g_B \approx 0$$

(by the channel hardening explained above), the RBS 102 computes in the step 406 the combined signal power $$p_A \beta_A + p_B \beta_B$$

by computing $$\frac{1}{M}\|\hat{g}\|^2:$$

$$\frac{1}{M}\|\hat{g}\|^2 \approx \frac{p_A}{M}\|g_A\|^2 + \frac{p_B}{M}\|g_B\|^2 \approx p_A\beta_A + p_B\beta_B \quad (4)$$

assuming that the noise is relatively weak.

The first and second equation signs in Eq. (4) exploit the near-orthogonality and the channel hardening according to Eqs. (2) and (1), respectively. In other words, the massive-MIMO implementation of the RBS 102 is enabled to compute, with reasonable accuracy, the combined signal power $p_A\beta_A+p_B\beta_B$ according to Eq. (4) in the step 406.

The UEs A and B learn their own channel gain β by listening to the multicast transmission 716 (or by listening to a beacon frequency, for that matter). So UE A knows $\beta_A$ (and $p_A$) and UE B knows $\beta_B$ (and $p_B$). It is not necessary that the UEs A and B know each others' β or power level p.

In order to prevent a pilot signal collision in the retransmission, the RBS 102 and the colliding UEs 106 perform the steps 408 and 504 to 510, respectively. The RBS 102 multicasts by beamforming along ĝ in the step 408 the message 716
- indicative of the combined power ($p_A\beta_A+p_B\beta_B$) being equal to [the value computed in step 406]; and
- instructing to re-access using a pilot signal from the set X if the UE has the "strong" channel, otherwise using a pilot signal from the set Y.

The UE A receives the multicast message 716. Based on the message 716, the UE A is informed of the combined power $p_A\beta_A+p_B\beta_B$. Since UE A already knows its individual signal power contribution $p_A\beta_A$ as a result of the step 508, the UE A computes $p_B\beta_B$ and determines whether $$p_A\beta_A > p_B\beta_B$$

or vice versa in an implementation of the step 510. If $p_A\beta_A > p_B\beta_B$, the UE A concludes that it has the "strong" channel and selects a pilot signal x randomly from the set x according to the instruction in the message 716. Otherwise, the UE A concludes that it has the "weak" channel and selects a pilot signal y randomly from the set Y.

Alternatively, the UE A determines whether $$2p_A\beta_A > p_A\beta_A + p_B\beta_B,$$

i.e., UE A is the stronger one, or $$2p_A\beta_A < p_A\beta_A + p_B\beta_B,$$

i.e., the UE A is the weaker one.

Similarly, UE B determines in the step 510 whether $$p_A\beta_A > p_B\beta_B$$

or vice versa. If $p_A\beta_A > p_B\beta_B$, UE B concludes that it has the "weak" channel and selects a pilot signal y randomly from Y. Otherwise, the UE B concludes that it has the "strong" channel and selects a pilot signal x randomly from the set X.

Alternatively, the UE B determines whether $$2p_B\beta_B > p_A\beta_A + p_B\beta_B,$$

i.e., UE B is the stronger one, or $$2p_B\beta_B < p_A\beta_A + p_B\beta_B,$$

i.e., the UE B is the weaker one.

So in the retransmission, the UEs A and B are guaranteed to select different pilot signals (among the permissible sets X and Y, respectively) and hence succeed without collision. If the pilot signal sets X and Y are not open for random access, there is also no risk for collision with further newcomer UEs 106.

In any of above exemplary implementations, the channel gain β for the different UEs 106 in a cell of the RBS 102 may largely vary. E.g., with a path loss exponent equal to four, the difference in the channel gain β is about a factor $10^4$ between two UEs 106 which distance to the RBS 102 differs by a factor of ten. Therefore, two colliding newcomers UEs 106 typically have very different values for the channel gain β.

In an embodiment of the technique, open-loop power-control is utilized to set the transmission power p for the pilot signal 712 as a function of the channel gain β. However, substantial variations in p·β are likely to exist in the cell, unless a very stringent power-control policy is used so that p proportional to 1/β. Often, a dynamic range of power amplifiers does not allow for such a power-control policy.

If there is a substantial probability that $p_A\beta_A \approx p_B\beta_B$, e.g., due to propagation conditions and/or power control, there is a risk that both UEs A and B determine in the step 510 themselves as having the "strong" channel or the "weak" channel.

Optionally, e.g., in this case, the UEs A and B further analyze their received signals 716 in the downlink.

E.g., UE A receives $$g_A^H \hat{g} \approx \sqrt{p_A}\|g_A\|^2 + \sqrt{p_B}g_A^H g_B$$

and UE B receives $$g_B^H \hat{g} \approx \sqrt{p_B}\|g_B\|^2 + \sqrt{p_A}g_B^H g_A.$$

The phase of the second term is the same but complex-conjugated for the two UEs A and B. The phase difference is optionally used to separate the two UEs A and B to reduce the collision probability in the retransmission.

Each of the distinct pilot signal sets x and Y may contain a single pilot signal or multiple pilot signals. Having multiple pilots reduces a residual risk for a new collisions in the retransmission, e.g., in the event that one of the colliding UEs is not able to correctly determine whether it has the "strong" or "weak" channel. In other words, an embodiment combines received signal power-based solution with the statistical solution.

With some probability, three or more newcomer UEs 106 could accidentally select the same pilot signal. However, the probability of such a collision between three UEs 106 is vastly smaller than the probability of a collision between two UEs 106. Some embodiments are extended to resolve higher-order collisions, e.g., by iteratively applying the above technique to two out of the at least three colliding UEs and/or by assigning pilot signals in the order of the signal power contribution. Furthermore, combination with the statistical solution (|X|>1 and |Y|>1) allows avoiding collisions in the retransmission.

The lower half of FIG. 7 schematically illustrates a communication for implementing the technique.

Each coherence interval 706 is partitioned into an uplink part for the access burst 710 and a downlink part for the message 716. In the uplink phase 710 (illustrated at the bottom-left), the at least two newcomer UEs 106 send their initial pilot signal 712. The active UEs 106 send their assigned pilot signal 712.

The RBS 102 estimates the channel based on the mutually orthogonal pilot signals 712 for each of the UEs 106. A UE-specific CSI is a result of the channel estimation for each non-colliding UE 106. The multicast CSI is a result of the channel estimation for colliding UE 106 using the same pilot signal according to the step 404. The UE 106 also send uplink data 714 in the coherence interval 706.

In the downlink phase 716 (illustrated at the bottom-right), the RBS 102 uses the channel estimates (illustrated at reference signs 718) obtained based on the uplink pilot signal to beamform data in a closed-loop mode to the UEs 106. Large spatial multiplexing gains are being harvested by serving many UEs 106 simultaneously in each coherence interval 706.

The multicasting step 408 optionally sends the message 716 at the same time-frequency resource as other beamforming transmissions 718, since the channel hardening property of Eq. (2) implies that the multicasting transmission 716 and the UE-specific transmissions 718 are mutually nearly orthogonal. An even higher degree of orthogonality is achieved by changing the multicast beamforming from $\hat{g}$ to $S^{-1}\hat{g}$, wherein $S^{-1}$ is a full-rank matrix that shapes the multicasting to suppress interference in certain spatial dimensions. E.g., strong eigen-directions of S are suppressed and weak eigen-directions are not suppressed.

Figure 8:
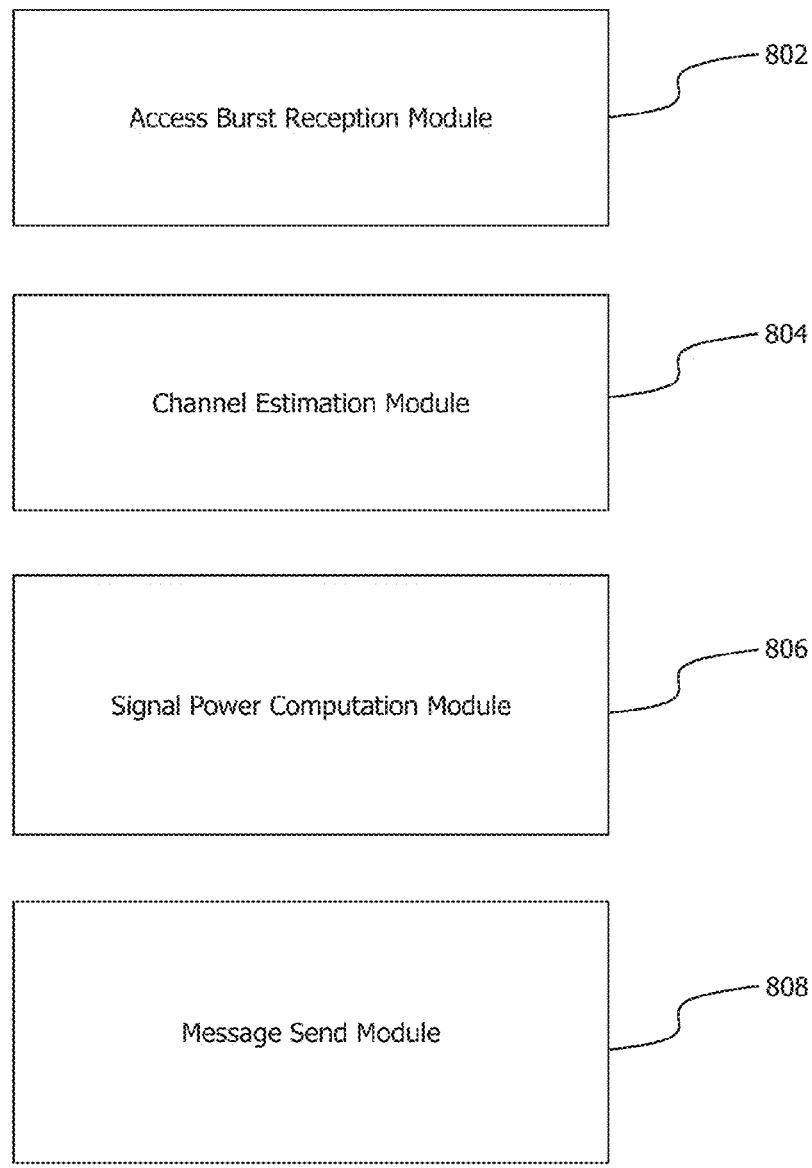
FIG. 8 is a diagram schematically illustrating an embodiment of a network node.

FIG. 8 schematically illustrates a network node 800 for assigning pilot signals to user equipments accessing a radio base station that provides radio access. The network node 800 comprises functional modules 802 to 808 to realize the steps 402 to 408, respectively. In an embodiment of the network node, e.g., the RBS 102, the modules are implemented by a computer program running on a processor of the network node 800.

Figure 9:
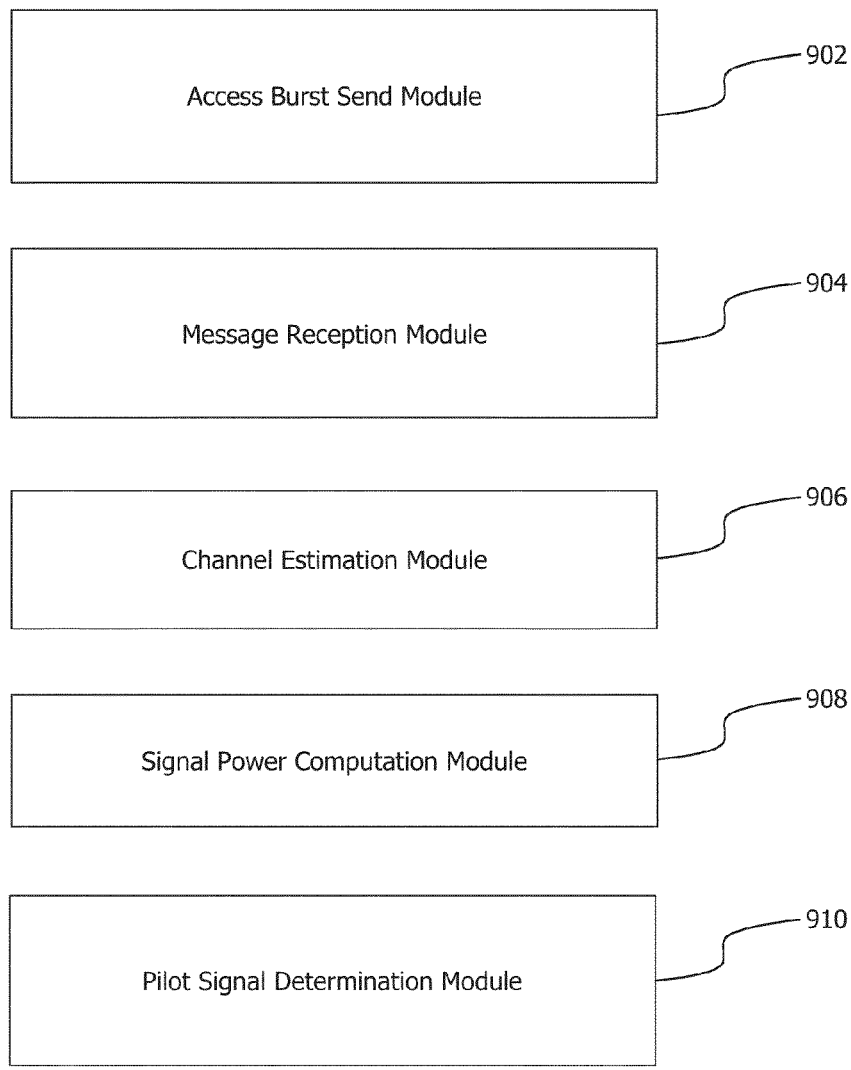
FIG. 9 is a diagram schematically illustrating an embodiment of a mobile terminal.

FIG. 9 schematically illustrates a mobile terminal 900 for assigning pilot signals to user equipments accessing a radio base station that provides radio access. The network node 800 comprises functional modules 902 to 910 to realize the steps 502 to 510, respectively. In an embodiment of the mobile terminal, e.g., the UE 106, the modules are implemented by a computer program running on a processor of the mobile terminal 900.

As has become apparent from above exemplary embodiments, the technique is applicable to a large number of phase-coherently operated antennas, e.g., in any LTE telecommunications standard and beyond LTE.

Embodiments of the presented technique reduce the extra amount of time-frequency resources needed for random access and/or reduce the latency of the random access in at least some embodiments. This advantage is valuable, e.g., in the context of machine-to-machine communications. The technique is optionally implemented in a telecommunications network for machine-to-machine communications with a large number of sleeping user equipments that access the radio base station with little delay and low energy expenditure.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of assigning pilot signals to user equipments accessing a radio base station that provides radio access, the method comprising:

receiving an access burst from the user equipments at the radio base station, the access burst including initial pilot signals, wherein at least two of the user equipments simultaneously apply the same initial pilot signal;

estimating, at the radio base station, a multicast channel to the at least two user equipments based on the received access burst;

computing, at the radio base station, a combined signal power received at the radio base station for the at least two user equipments based on the estimated multicast channel;

sending, from the radio base station, a message to the at least two user equipments using the multicast channel, wherein the message is indicative of the combined signal power and assigns different pilot signals to the at least two user equipments;

wherein the assignment of the different pilot signals, for each of the at least two user equipments, depends on the combined signal power and a signal power received at the respective user equipment.

2. The method of claim 1, wherein the signal power received at the respective user equipment is computed based on either:

the message as received at the respective user equipment; or a broadcast message from the radio base station.

3. The method of claim 2, wherein both the access burst is received and the message is sent within one coherence interval.

4. The method of claim 1, wherein the at least two user equipments include a first user equipment and a second user equipment different from the first user equipment;

wherein the message assigns a first pilot signal to the first user equipment if twice the signal power received at the first user equipment is greater than the combined signal power;

wherein the message assigns a second pilot signal, different from the first pilot signal, to the second user equipment if twice the signal power received at the second user equipment is less than the combined signal power.

5. The method of claim 4, wherein the message assigns a first set of pilot signals including the first pilot signal to the first user equipment and a second set of pilot signals disjoint from the first set and including the second pilot signal to the second user equipment;

wherein the first and second user equipments select the first and second pilot signals out of the first and second sets, respectively.

6. The method of claim 1, wherein the initial pilot signals from the at least two user equipments overlap in time and frequency.

7. The method of claim 1, wherein the radio base station determines that the at least two user equipments apply simultaneously the same initial pilot signal if the received access burst is not decodable and a signal strength of the access burst exceeds a threshold value.

8. The method of claim 1 wherein the radio base station provides the radio access by means of a plurality of transceiving antennas;

wherein the computing comprises a summation over the plurality of transceiving antennas.

9. The method of claim 8, wherein the summation includes squared absolute values of antenna components for the multicast channel.

10. The method of claim 1,
wherein the signal power received at the respective user equipment includes a product of link attenuation ($\beta$) and transmit power (p);
wherein the link attenuation is an attenuation for a link between the radio base station and the respective user equipment.

11. The method of claim 1, further comprising:
receiving, from each of the at least two user equipments, a further access burst including the respectively assigned pilot signal;
estimating a channel to each of the at least two user equipments based on the received further access burst.

12. The method of claim 1,
wherein the radio access includes a time division duplex transmission;
wherein the pilot signals are configured for reverse channel estimation.

13. A method of assigning pilot signals to user equipments accessing a radio base station that provides radio access, the method comprising:
sending an access burst from a user equipment to the radio base station, the access burst including an initial pilot signal, wherein at least one other of the user equipments applies simultaneously the same initial pilot signal;
receiving, at the user equipment, a multicast message from the radio base station, wherein the multicast message is indicative of a combined signal power received at the radio base station from the user equipment and the at least one other user equipment;
estimating, at the user equipment, a channel to the radio base station;
computing, at the user equipment, a signal power received at the user equipment based on the estimated channel;
determining, at the user equipment, a pilot signal assigned to the user equipment, wherein the assignment depends on the combined signal power indicated by the multicast message and the signal power received at the user equipment.

14. The method of claim 13, wherein the estimating the channel comprises estimating the channel based on the multicast message as received at the user equipment or based on a broadcast message from the radio base station.

15. The method of claim 13,
wherein a first pilot signal is assigned to the user equipment if twice the signal power received at the user equipment is greater than the combined signal power;
wherein a second pilot signal, different from the first pilot signal, is assigned to the user equipment if twice the signal power received at the user equipment is less than the combined signal power.

16. The method of claim 13, further comprising sending a further access burst including the assigned pilot signal to the radio base station.

17. A computer program product stored in a non-transitory computer readable medium for assigning pilot signals to user equipments accessing a radio base station that provides radio access, the computer program product comprising software instructions which, when run on one or more processing circuits of the user radio base station, causes the radio base station to:
receive an access burst from the user equipments, the access burst including initial pilot signals, wherein at least two of the user equipments simultaneously apply the same initial pilot signal;
estimate a multicast channel to the at least two user equipments based on the received access burst;
compute a combined signal power received at the radio base station for the at least two user equipments based on the estimated multicast channel;
send a message to the at least two user equipments using the multicast channel, wherein the message is indicative of the combined signal power and assigns different pilot signals to the at least two user equipments;
wherein the assignment of the different pilot signals, for each of the at least two user equipments, depends on the combined signal power and a signal power received at the respective user equipment.

18. A computer program product stored in a non-transitory computer readable medium for controlling a user equipment, the user equipment being one of a plurality of user equipments accessing a radio base station that provides radio access, the computer program product comprising software instructions which, when run on one or more processing circuits of the user equipment, causes the user equipment to:
send an access burst from the user equipment to the radio base station, the access burst including an initial pilot signal, wherein at least one other of the user equipments applies simultaneously the same initial pilot signal;
receive a multicast message from the radio base station, wherein the multicast message is indicative of a combined signal power received at the radio base station from the user equipment and the at least one other user equipment;
estimate a channel to the radio base station;
compute a signal power received at the user equipment based on the estimated channel;
determine a pilot signal assigned to the user equipment, wherein the assignment depends on the combined signal power indicated by the multicast message and the signal power received at the user equipment.

19. A network node for assigning pilot signals to user equipments accessing a radio base station that provides radio access, the network node comprising:
an access burst reception circuit configured to receiving an access burst from the user equipments, the access burst including initial pilot signals, wherein at least two of the user equipments apply simultaneously the same initial pilot signal;
a channel estimation circuit configured to estimating a multicast channel to the at least two user equipments based on the received access burst;
a signal power computation circuit configured to computing a combined signal power received at the radio base station for the at least two user equipments based on the estimated multicast channel; and
a message send circuit configured to sending a message to the at least two user equipments using the multicast channel, wherein the message is indicative of the combined signal power and assigns different pilot signals to the at least two user equipments;
wherein the assignment of different pilot signals, for each of the at least two user equipments, depends on the combined signal power and a signal power received at the respective user equipment.

20. A mobile terminal, comprising:
an access burst sending circuit configured to send an access burst including an initial pilot signal from a user equipment to the radio base station providing radio access to user equipments, wherein at least one other of the user equipments applies simultaneously the same initial pilot signal;

a message reception circuit configured to receive a multicast message from the radio base station, wherein the multicast message is indicative of a combined signal power received at the radio base station from the user equipment and the at least one other user equipment;

a channel estimation circuit configured to estimate a channel to the radio base station;

a signal power computation circuit configured to compute a signal power received at the user equipment based on the estimated channel;

a pilot signal determination circuit configured to determine a pilot signal assigned to the user equipment, wherein the assignment depends on the combined signal power indicated by the multicast message and the signal power received at the user equipment.

21. A device comprised in a radio base station for assigning pilot signals to user equipments accessing the radio base station that provides radio access, the device comprising:

a receiving circuit configured to receive an access burst from the user equipments, the access burst including initial pilot signals, wherein at least two of the user equipments apply simultaneously the same initial pilot signal;

an estimating circuit configured to estimate a multicast channel to the at least two user equipments based on the received access burst;

a computing circuit configured to compute a combined signal power received at the radio base station for the at least two user equipments based on the estimated multicast channel;

a sending circuit configured to send a message to the at least two user equipments using the multicast channel, wherein the message is indicative of the combined signal power and assigns different pilot signals to the at least two user equipments;

wherein the assignment of the different pilot signals, for each of the at least two user equipments, depends on the combined signal power and a signal power received at the respective user equipment.

22. A device comprised in a user equipment accessing a radio base station for assisting in the assignment of pilot signals to user equipments accessing the radio base station that provides radio access, the device comprising:

a sending circuit configured to send an access burst including an initial pilot signal from the user equipment to the radio base station, wherein at least one other of the user equipments applies simultaneously the same initial pilot signal;

a receiving circuit configured to receive a multicast message from the radio base station, wherein the multicast message is indicative of a combined signal power received at the radio base station from the user equipment and the at least one other user equipment;

an estimating circuit configured to estimate a channel to the radio base station;

a computing circuit configured to compute a signal power received at the user equipment based on the estimated channel;

a determining circuit configured to determine a pilot signal assigned to the user equipment, wherein the assignment depends on the combined signal power indicated by the multicast message and the signal power received at the user equipment.

* * * * *

UNITED STATES PATENT AND TRADEMARK OFFICE
CERTIFICATE OF CORRECTION

PATENT NO.        : 9,860,039 B2
APPLICATION NO.   : 14/429534
DATED             : January 2, 2018
INVENTOR(S)       : Larsson et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 1, Line 11, delete "Bj•rnson," and insert -- Bjornson, --, therefor.

On Page 2, in Item (56), under "OTHER PUBLICATIONS", in Column 2, Line 3, delete "Bj•rnson," and insert -- Bjornson, --, therefor.

In the Specification

In Column 8, Line 23, delete "telecommunications network 102." and insert -- telecommunications network 100. --, therefor.

In Column 13, Line 24, delete "urn:nbs:se:liu:diva-112759)." and insert -- urn:nbs:se:liu:diva-112759). --, therefor.

In Column 13, Line 49, delete "P$_B$," and insert -- p$_B$, --, therefor.

In Column 15, Line 44, delete "x" and insert -- X --, therefor.

In Column 16, Line 39, delete "x" and insert -- X --, therefor.

Signed and Sealed this
Third Day of April, 2018

Andrei Iancu
*Director of the United States Patent and Trademark Office*